US011385517B1

(12) United States Patent
Thaniyavarn

(10) Patent No.: US 11,385,517 B1
(45) Date of Patent: Jul. 12, 2022

(54) DUAL POLARIZATION OPTICAL MODULATOR WITH INDEPENDENT PHASE TUNING FOR EACH POLARIZATION STATE AND ITS APPLICATION IN AN OPTICAL INTEGRATED CIRCUIT ARCHITECTURE FOR OPTICALLY-CONTROLLED RF PHASED-ARRAY BEAM FORMING

(71) Applicant: EOSpace Inc., Redmond, WA (US)

(72) Inventor: Suwat Thaniyavarn, Vekkevye, WA (US)

(73) Assignee: EOSpace Inc., Redmond, WA (US)

( * ) Notice: Subject to any disclaimer, the term of this patent is extended or adjusted under 35 U.S.C. 154(b) by 0 days.

(21) Appl. No.: 15/821,110

(22) Filed: Nov. 22, 2017

Related U.S. Application Data

(60) Provisional application No. 62/425,757, filed on Nov. 23, 2016.

(51) Int. Cl.
*G02F 1/225* (2006.01)
*G02F 1/01* (2006.01)
*G02F 1/21* (2006.01)

(52) U.S. Cl.
CPC ............ *G02F 1/225* (2013.01); *G02F 1/0123* (2013.01); *G02F 1/212* (2021.01); *G02F 2203/055* (2013.01); *G02F 2203/20* (2013.01)

(58) Field of Classification Search
None
See application file for complete search history.

(56) References Cited

U.S. PATENT DOCUMENTS

| 5,015,053 A * | 5/1991 | Johnson ................. G02F 1/0327 385/2 |
| 8,098,998 B2 * | 1/2012 | Takashima ........... H04B 10/5167 398/183 |
| 2004/0109223 A1 * | 6/2004 | Sugiyama ............. G02F 1/2255 359/321 |

OTHER PUBLICATIONS

Binh et al. ("An Optical Fiber Dispersion Measurement Technique and System", Technical Report MECSE-14-2005, Department of Electrical & Computer Systems Engineering, Monash University, Clayton Campus, Victoria 3168, Australia, 2005, pp. 1-22) (Year: 2005).*

* cited by examiner

*Primary Examiner* — Michelle R Connelly
(74) *Attorney, Agent, or Firm* — James Creighton Wray

(57) ABSTRACT

A Dual-polarization optical modulator that can be used to modulate light in both polarization states, in which the operating points of each polarization state can be set at any arbitrary point independently from each other. A novel architecture for an optically-controlled Phased-array beam forming system utilizing this unique dual-polarization is proposed to facilitate simple and practical implementation.

14 Claims, 10 Drawing Sheets

LiNbO$_3$ ELECTRO-OPTIC TENSOR $$\begin{vmatrix} \Delta(1/n^2)_x \\ \Delta(1/n^2)_y \\ \Delta(1/n^2)_z \\ \Delta(1/n^2)_{yz} \\ \Delta(1/n^2)_{zx} \\ \Delta(1/n^2)_{xy} \end{vmatrix} = \begin{vmatrix} 0 & -r_{22} & r_{13} \\ 0 & r_{22} & r_{13} \\ 0 & 0 & r_{33} \\ 0 & r_{51} & 0 \\ -r_{51} & 0 & 0 \\ -r_{22} & 0 & 0 \end{vmatrix} \cdot \begin{vmatrix} E_x \\ E_y \\ E_z \end{vmatrix}$$

FIG. 1

| $n_x \longrightarrow n_o + \Delta n_x$ | $\Delta n_x \sim -\frac{1}{2} \cdot n_o^3 \cdot \{ r_{13} \cdot E_z - r_{22} \cdot E_y \}$ |
|---|---|
| $n_y \longrightarrow n_o + \Delta n_y$ | $\Delta n_y \sim -\frac{1}{2} \cdot n_o^3 \cdot \{ r_{13} \cdot E_z + r_{22} \cdot E_y \}$ |
| $n_z \longrightarrow n_e + \Delta n_z$ | $\Delta n_z \sim -\frac{1}{2} \cdot n_e^3 \cdot \{ r_{33} \cdot E_z \}$ |

$n_x, n_y, n_z$ ARE THE OPTICAL INDEX IN $x$-, $y$-, AND $z$ DIRECTION RESPECTIVELY
$\Delta n_x, \Delta n_y, \Delta n_z$ ARE THE ELECTRO-OPTICALLY INDUCED INDEX CHANGES IN $x$-, $y$-, AND $z$ DIRECTION
$E_x, E_y, E_z$ ARE THE ELECTRIC FIELDS IN $x$-, $y$-, AND $z$ DIRECTION
FOR THE BIREFRINGENCE LiNbO$_3$, $n_x = n_y = n_o$ (ORDINARY INDEX), AND $n_z = n_e$ (EXTRA-ORDINARY INDEX)

FIG. 2

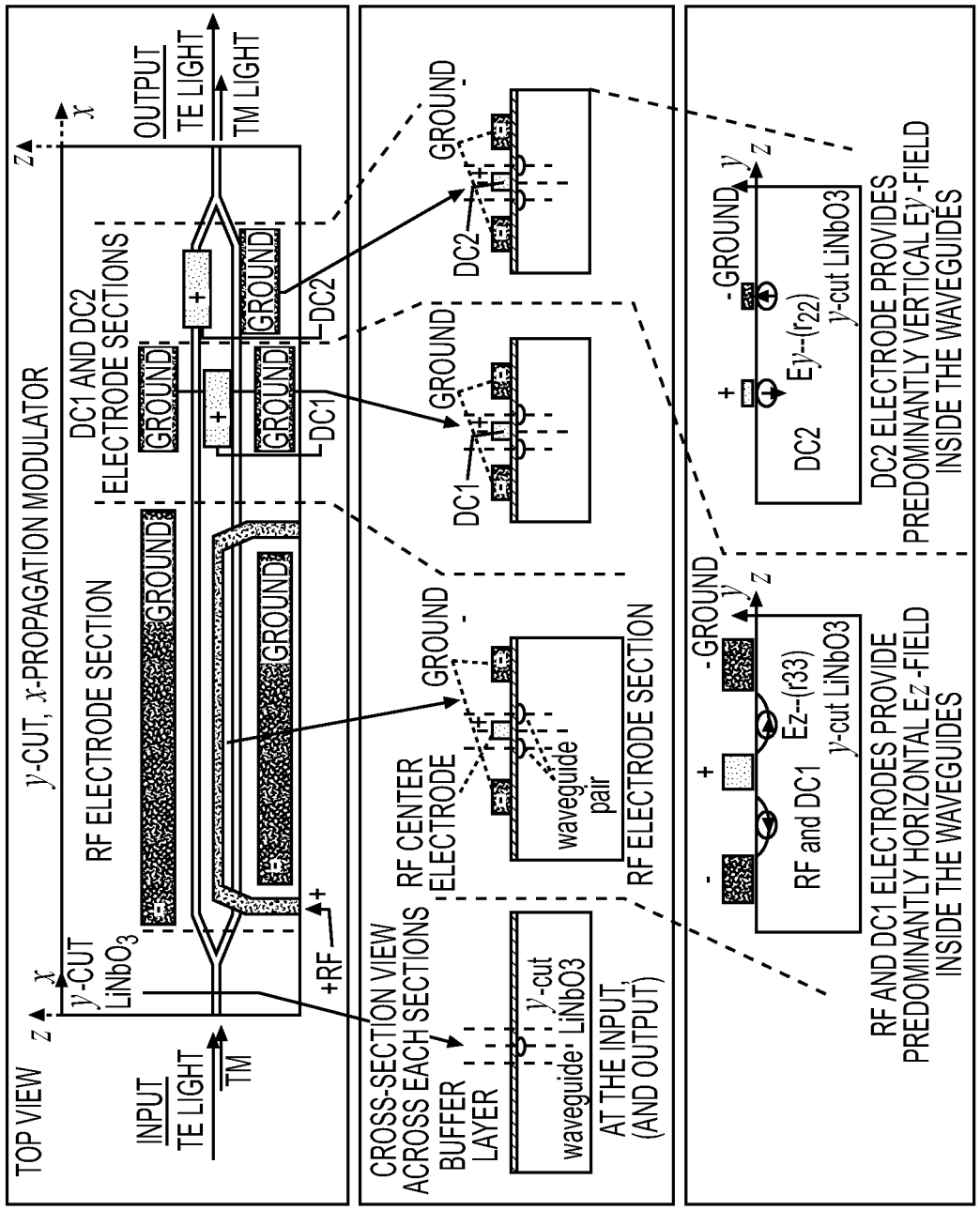

IN GENERAL, WITH DC1, DC2 SET AT SOME ARBITRARY VALUES, THE TE "NULL" TRANSMISSION AND THE TM "PEAK" TRANSMISSION DO NOT OCCUR AT THE SAME TIME.

SINCE DC1, DC2 CAN BE ADJUSTED, IT IS POSSIBLE TO ACHEIVE THE TE "NULL" TRANMISSION AND THE TM "PEAK" TRANSMISSION AT THE SAME TIME.

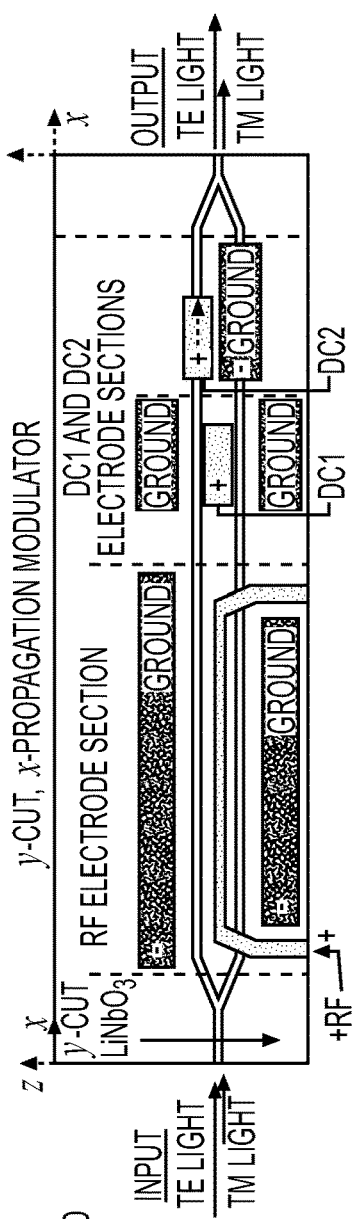
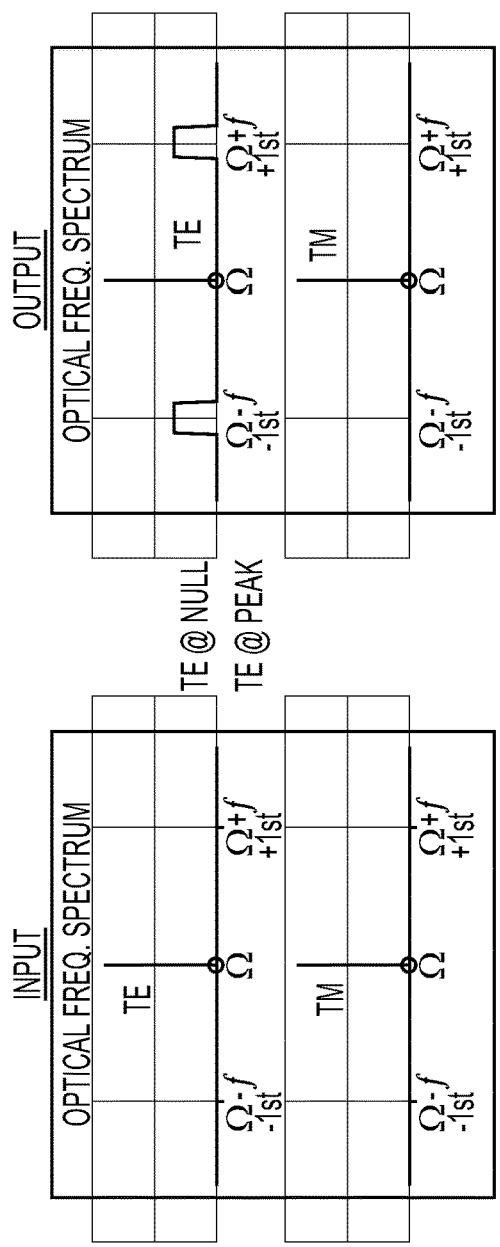
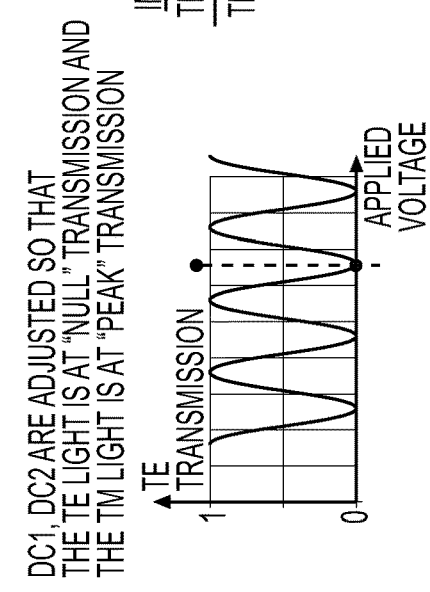
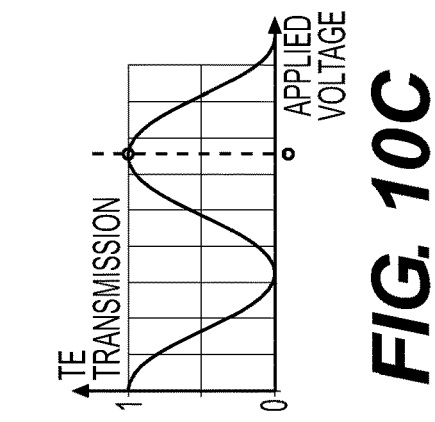

DUAL POLARIZATION OPTICAL MODULATOR WITH INDEPENDENT PHASE TUNING FOR EACH POLARIZATION STATE AND ITS APPLICATION IN AN OPTICAL INTEGRATED CIRCUIT ARCHITECTURE FOR OPTICALLY-CONTROLLED RF PHASED-ARRAY BEAM FORMING

This application claims the benefit of U.S. Provisional Application No. 62/425,757 filed Nov. 23, 2016, which is hereby incorporated by reference in its entirety as if fully set forth herein.

BACKGROUND OF THE INVENTION

For electro-optic crystal, such as $LiNbO_3$, an applied electric field can induce a change in the optical refractive indices ($\Delta n_{ij}$) of the material which in turns affects the optical wave propagating through the crystal. The electro-optic induced change in the material indices ($\Delta n_{ij}$) due to an applied electric field ($E_x$, $E_y$, $E_z$) can be calculated using the electro-optic ($r_{ij}$) tensor, as shown in FIG. 1 for $LiNbO_3$ crystal.

The electro-optically-induced index changes ($\Delta n_x$, $\Delta n_y$, $\Delta n_z$) in $LiNbO_3$ depend on the electro-optic coefficients, the electric field ($E_x$, $E_y$ and $E_z$) strengths, and the overlap integral between the electric field component and the optical wave. The relative electro-optically induced changes in the ($\Delta n_x$, $\Delta n_y$, $\Delta n_z$) are shown in FIG. 2. The corresponding change in the optical phase ($\Delta \phi$) of the propagating optical wave inside the waveguide is linearly proportional to the associated ($\Delta n$).

The simplest modulator is the electro-optic waveguide phase modulator with a single waveguide with an integrated electrode structure. An intensity modulator can be constructed based on these phase modulator waveguide structures. The most common intensity modulator is the "Mach-Zehnder" (MZ) Interferometric modulator.

Electro-Optic $LiNbO_3$ Phase and Intensity Waveguide Modulators:

The detail description and operational principle of a Lithium niobate ($LiNbO_3$) electro-optic waveguide modulator can be readily found in literature. See for example: "A Review of Lithium Niobate Modulators for Fiber-Optic Communications Systems", IEEE Journal of Selected Topics in Quantum Electronics, Vol. 6, No. 1, January/February 2000, Ed L. Wooten, et. al.

In brief, a typical conventional $LiNbO_3$ electro-optic modulator consists of an optical waveguide circuit fabricated on the surface of a $LiNbO_3$ wafer on various crystal (x-, y- or z-) cuts, with the electrode structure in close-proximity to the waveguide circuit. For broadband (DC to tens of GHz's) operation, a transmission-line type electrode is typically used.

$LiNbO_3$ is an electro-optic crystal. When voltage is applied to the electrode, the associated electric field is generated inside the optical waveguide. This electric field induces a change in the crystal indices ($\Delta n_x$, $\Delta n_y$, $\Delta n_z$) via the linear electro-optic interaction. Using a well-known conventional Titanium in-diffusion technique, optical waveguide can be formed on $LiNbO_3$ substrate that supports singlemode waveguide operation for each of the orthogonal optical polarization states.

The electro-optic interaction is described by the electro-optic tensor consisting of various electro-optic coefficients. To achieve maximum modulator's efficiency, the $LiNbO_3$-based modulator is typically designed so that the electro-optic interaction inside the waveguide is via the largest $r_{33}$ ($r_{zz}$) interaction between the optical wave polarized along the z-axis of the $LiNbO_3$ crystal and the $E_z$, the electric field along the z-axis of the $LiNbO_3$ crystal.

However, the other optical wave polarized along the x- or y-axis of the $LiNbO_3$ crystal interacts with the applied electric fields via weaker electro-optic coefficients.

Therefore for most applications, a conventional $LiNbO_3$ modulator is designed to operate properly with a linear polarized light polarized along the z-axis.

A MZ Interferometric waveguide modulator consists of an input singlemode optical waveguide branching out to a pair of phase-modulator waveguide arms that recombine back to a singlemode output waveguide. The most common conventional MZ Intensity modulator is fabricated on an x-cut, y-propagating waveguide circuit as shown in FIG. 3.

For an electro-optic Lithium niobate MZ waveguide modulator, an applied voltage produces an electric field that can induce a change in the optical index inside the optical waveguide via the electro-optic interaction. The electro-optic interaction changes or modulates the optical phase of light propagating inside the waveguide.

A typical MZ modulator shown in FIG. 3 has two electrode structures, RF and DC, in the middle waveguide pair section. Typically, the RF electrode is a CPW (CoPlanar Waveguide) transmission-line structure with a center hot electrode and two grounds. An RF/data or broadband electrical signal can be applied to modulate the light via the electro-optic interaction. Another electrode is a DC-low frequency capacitive electrode structure in which a bias voltage can be applied to set the operating point of this intensity modulator.

Light inside the waveguide pair in the middle section of the MZ circuit can be phase-modulated in the opposite polarities to create a differential phase change between them. The output optical transmission of the device varies as a result of the interference between the light from the two waveguide arms. The optical transmission of this MZ interferometric modulator is a sinusoidal (cosine squared) function of the the applied voltage.

For a typical operation, a DC bias voltage is applied to the DC electrode to set the operating point of the modulator at various points, such as "Peak", "Null" or "Quadrature ½-power" transmission points. A broadband or high-frequency RF electrical signal is applied to the RF electrode to modulate the lightwave via the electro-optic interaction.

The electrode structures of this x-cut y-propagation MZ modulator shown in FIG. 3 are symmetrically located with respected to the middle interferometric phase modulator waveguide pair, so that the electro-optically-induced $\Delta n$ changes are equal in magnitude, but opposite in signs between the two phase modulator arms of the MZ structure. This is known as zero-chirp device.

The associated electric fields are in the transverse direction to the waveguide propagation direction and therefore is no $E_y$ field component inside the waveguides. The electro-optic induced $\Delta n_z$, $\Delta n_x$ are shown again in FIG. 4.

In order to utilize the strongest electro-optic interaction ($r_{33}$) for maximum efficiency, the input light should be polarized along the z-direction (TE-horizontal polarization). The electro-optic induced $\Delta n_z$ is via the strongest ($r_{33} \cdot E_z$) interaction.

The other orthogonal light polarized along the x-direction (TM-vertical polarization), the electro-optic induced $\Delta n_x$ is via a weaker ($r_{13} \cdot E_z$) interaction. ($r_{13} \ll r_{33}$).

Because of the difference in the electro-optic interaction strengths between the two polarization states, a conventional modulator is commonly designed and optimized for single-TE polarization operation to avoid polarization crosstalk issue, etc.

However, there are important applications that can benefit from an un-conventionnal Intensity modulator that can modulate light in both polarization states, with the unique feature in which the operating points for each polarization states can be set independently.

SUMMARY OF THE INVENTION

This patent invention provides a modulator that can modulate both optical polarization states, with the operating point of each of the orthogonal polarization states can be set independently. Unfortunately, this conventional x-cut y-propagating MZ modulator structure cannot be used.

As shown in FIG. 4, $\Delta n_z$ and $\Delta n_x$ are both dependent only on the transverse $E_z$-field component, and there is no electro-optic interaction via the transverse $E_x$ component in $LiNbO_3$ crystal, since the operating point of the MZ modulator for each polarization is set by the corresponding $\Delta n$ for that polarization state.

Once the voltage is applied to set the operating point for the TE-polarized light, the TM-polarized is also set. Therefore the operating point of each polarization states can not be adjusted independently. It is not possible to set a DC bias voltage so that the operating point of the TE light is set at "Null transmission", while TM light is set at "Peak transmission" independently, and vice versa.

This invention describes a wideband electro-optic modulator with a unique feature. The modulator can modulate optical signals in distinct orthogonal polarizations. The operating points of the modulator for each of the optical signals in the two polarization states (i.e. TE- and TM-polarized optical signals) can be set to any position independently of one another. For example, the operating point of the TE-polarized light can be set at the 'Peak' transmission point, while the TM-polarized light can be set to any arbitrary point, including the 'Peak', 'Null', '½ power-quadrature', or any other arbitrary point independently of the TE light, and vice versa.

This electro-optic modulator can be based on a variety of intensity modulator structures. One of the most common structures is based on a Mach-Zehnder (MZ) interferometric waveguide structure with a sinusoidal (cosine squared) optical transmission function with respect to an applied voltage. The modulator can be fabricated in a waveguide structure on electro-optic Lithium Niobate (LN).

This device can also implemented on other electro-optic materials such as semiconductors, optical polymers or other electro-optic materials (Lithium Tantalate, KTP, PLZT, etc.) using a variety of interactions including linear and non-linear electro-optic effects, thermal, piezo-stress effects, etc. In general, the electro-optic effect is preferred owing to its high-efficiency, wide bandwidth and high-frequency modulation capability.

A dual-polarization wide-bandwidth optical modulator in which the optical signals in each polarization-state can be operated independently from one another at any arbitrary operation point can be used in a number of applications including advanced optical modulation and optical signal processing functions. By combining this dual-polarization modulator with other optical components, an optical signal processing circuit can be formed to perform a more complex function (including signal generation, control and processing functions).

This invention discloses and describes an optical circuit architecture for optically-controlled RF phased-array beam forming that utilizes this dual polarization modulator as one of the key optical components.

A dual polarization modulator has independent phase tuning to set the operating point for each polarization state.

To achieve the unique independent phase tuning for two polarizations of light (for example TE and TM polarizations) within a Lithium Niobate waveguide structure an unconventional Y-cut, X-propagating Lithium Niobate crystal is utilized. There are a few techniques to realize this LiNbO3 modulator with these features. One of the approaches is shown in FIG. 6A.

FIG. 6A shows a top view of the Y-cut, X-propagating Lithium Niobate chip using a Mach Zehnder interferometric waveguide structure with three different and independent (RF, DC1 and DC2) electrode structures. Typically the "RF" electrode is a symmetric coplanar waveguide (CPW) transmission line electrode structure that is used to apply the RF signal. This is the same type of electrode structure that is conventionally used with the more common X-cut Y-propagation devices. In this electrode structure, the horizontal (Z-direction) E-field will interact with the TE light horizontally-polarized in the z-direction via the strongest $r_{33}$ electro-optic interaction, $\Delta n_z$, as required for highest efficiency modulation. This electro-optic interaction is illustrated in the cross section view of the chip on the left side of FIG. 6B. The TM polarized light (vertically-polarized in the Y-direction) experiences a much weaker modulation via the $r_{13}$ electro-optic interaction to produce a ($\Delta n_y$). The other two electrodes (DC1 and DC2) are used to set the independent operating points for the two orthogonal TE and TM polarized light.

The RF and DC1-bias electrodes are located to generate electrical field inside the waveguides predominately in the horizontal z-direction. The second DC2-bias electrode with its electrodes located above the optical waveguides, shown on the right side of the chip in FIG. 6A, to generate electrical field predominately in the vertical y-direction. This unique feature allows us to adjust the operating point of the TM light independently from the TE light, since $r_{22}$ and the electric field along the y-direction $E_y$ do not affect the $\Delta n_z$ of the TE light. With two independent DC bias electrodes arranged to maximize the E-field in different directions, one can arbitrarily set the operating point of the TE and TM polarized light, differently from one another. The fine-tuning ability of the linear electro-optic interaction with voltage means that a very precise operating point can be set for each polarization to achieve maximum signal suppression, for example at the deepest null point for one polarization and maximum transmission for the other polarization.

The structure of the unique dual polarization modulator with independent phase tuning for each polarization has been described above. At the top of the FIG. 5A is illustrated one representative application of this modulator to produce different optical sidebands on the TE and TM polarizations that can be applied to optically controlled RF phased array beam forming applications. The dual polarization modulator with a high speed CPW RF electrode and two independent DC bias electrodes is designed to transmit both TE and TM modes with low insertion loss. As described above, the modulator is designed so that the TM and TE-polarized light can be operated independently at any arbitrary point. In the example shown in the FIG. 5A, the operating point of the TE light is set to null transmission so that the modulator acts as a double-sideband modulator with suppressed carrier (DSB-SC), while the operating point of the TM light is set at peak transmission, in which the RF modulated first order sidebands are suppressed, leaving mainly the largely unaffected carrier. How this configuration is desirable in an optically controlled RF phased array beam forming application is discussed in the following sections.

These and further and other objects and features of the invention are apparent in the disclosure, which includes the above and ongoing written specification, with the claims and the drawings.

BRIEF DESCRIPTION OF THE DRAWINGS

FIG. 1 shows $LiNbO_3$ electro-optic tensor ($r_{ij}$ are the linear electro-optic coefficients).

FIG. 2 shows $\Delta n_x$, $\Delta n_y$, $\Delta n_z$ electro-optic interaction.

FIGS. 6A-6C show a y-cut, x-propagating MZ waveguide modulator with three electrode structures (RF, DC1 and DC2).

FIGS. 7 and 8 show y-cut, x-propagating MZ waveguide modulators with three electrode structures (RF, DC1 and DC2).

FIGS. 10A-10E show optical frequency spectrum of the modulated optical signals of the TE-polarized light, biased at "Null" transmission and the TM-polarized light, biased at peak transmission.

DETAILED DESCRIPTION

The invention of the electro-optic intensity modulator that can modulate both orthogonal TE-polarized and TM-polarized light, in which the operating point of each polarization states can be set independently, is described in the FIG. 6A. The modulator is based on MZ interferometric waveguide structure fabricated on a y-cut x-propagation $LiNbO_3$ crystal, with three electrode (RF, DC1, DC2) structures in the middle waveguide pair section.

The electrode structures are symmetrically-located with respected to the middle interferometric phase modulator waveguide pair, so that the electro-optically-induced $\Delta n$ changes are equal in magnitude, but opposite in signs between the two phase modulator arms of the MZ structure, resulting in a zero-chirp modulator. The RF electrode is a wideband CPW (CoPlanar Waveguide) transmission-line structure with a center "hot" electrode and two grounds. An RF/data (or broadband) electrical signal can be applied to modulate the light via the electro-optic interaction. There are two DC-low frequency capacitive electrode DC1 and DC2 structures in which bias voltages can be applied to set the operating points of the TE-polarized and TM-polarized light waves independently.

The RF and DC1 electrodes are designed to maximize the horizontal $E_z$ fields inside the waveguide pair, so that the electro-optic TE: horizontally-polarized light and $E_z$ interaction is via the strongest $r_{33}$ coefficient. The DC2 electrode is designed to maximize the vertical $E_y$ fields inside the waveguide pair, so that the electro-optic TM: vertically-polarized light and $E_y$ interaction is via a different $r_{22}$ coefficient, as shown in FIGS. 6A-C.

Figure 7:
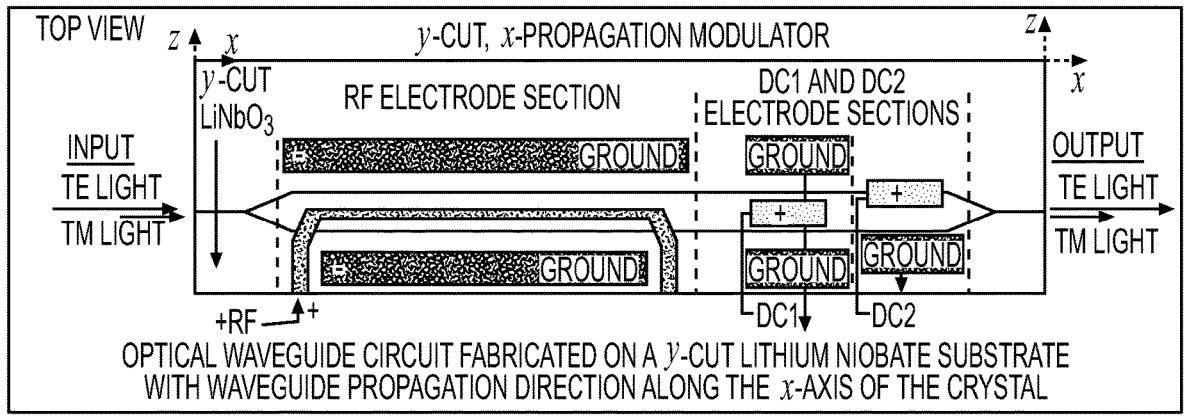

The relative electro-optically induced changes in the ($\Delta n_y$, $\Delta n_z$) for the TM and TE light are shown in FIGS. 7 and 8. The corresponding change in the optical phase ($\Delta \phi$) of the propagating optical wave inside the waveguide is linearly proportional to the associated ($\Delta n$) for each polarization state.

The operating point of the MZ modulator for each of the two polarization states can be set by the corresponding $\Delta n$ for each polarization state. For this y-cut x-propagation MZ modulator (FIGS. 7 and 8), the transverse electric fields are $E_z$ and $E_y$. The operating point (set by $\Delta n_z$) of the TE-polarized light can be set by the $E_z$ field, and the operating point (set by $\Delta n_y$) of the TM-polarized light can be set by a combination of $E_z$- and $E_y$-fields.

Therefore, the operating point of the TE-polarized light is set by applying a proper $E_z$-field. The operating point of the TM-polarized light can be set at any other arbitrary operating point at the same $E_z$-field, with an additional adjustment of the $E_y$-field.

For example, the operating point of the TE-light can be set at the "Null-transmission" point by applying a proper $E_z$-field so that the two phase modulated light from the waveguide pair in the MZ structure are 180° out-of-phase with each other and interfere destructively. By adjusting the extra $E_y$-field component which affects the ($\Delta n_y$), the operating point of the TM-light can be set at "Peak", "Null" or any other arbitrary transmission points.

Since there are two independent DC bias electrodes, with DC1 generating predominating $E_z$-field inside the waveguides, and DC2 generating predominating $E_y$-field inside the waveguides, two bias voltages can be applied to DC1 and DC2 to set the operating points of the TE- and TM-polarized light at any arbitrary transmission points.

A series of optical transmission functions are shown for both TE- and TM-polarized light for our proposed dual-polarization modulator design are shown in FIGS. 9A-E.

Figure 9A:
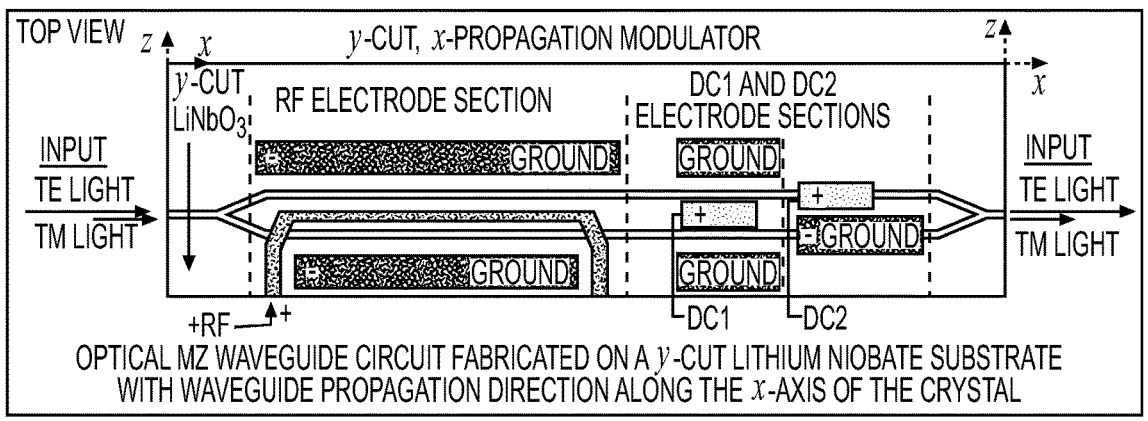
FIGS. 9A-9E show optical transmissions of the TE- and TM-polarized lights as a function of an applied voltage for a y-cut, x-propagating MZ waveguide modulator.
Figure 9B:
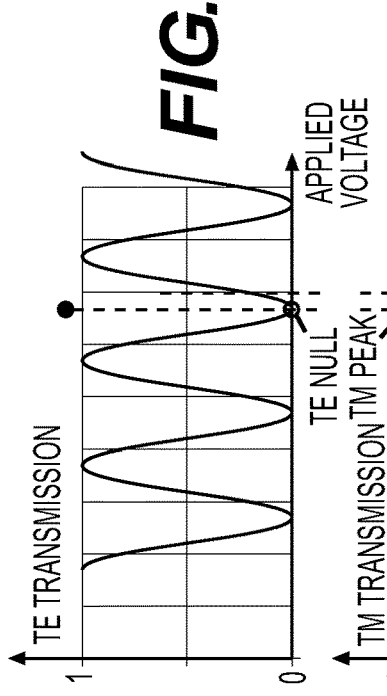
Figure 9D:
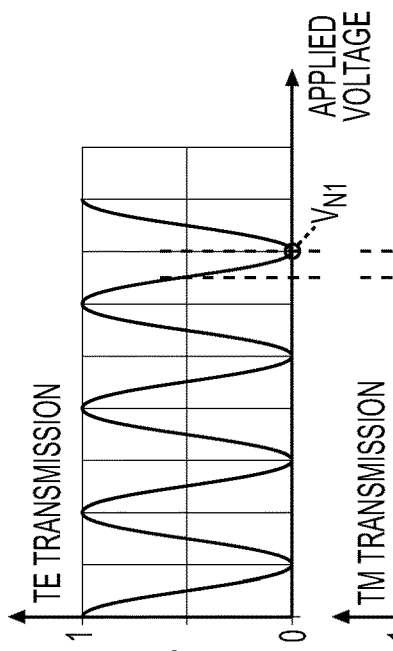
Figure 9C:
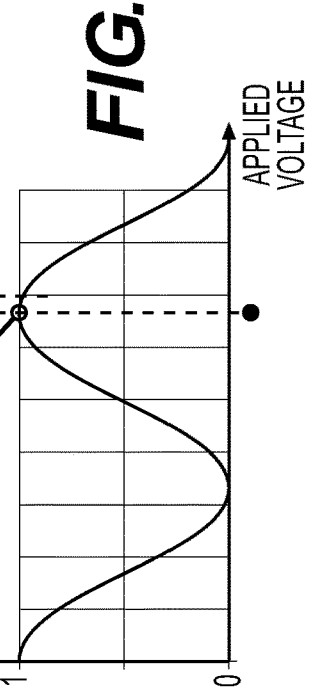
Figure 9E:
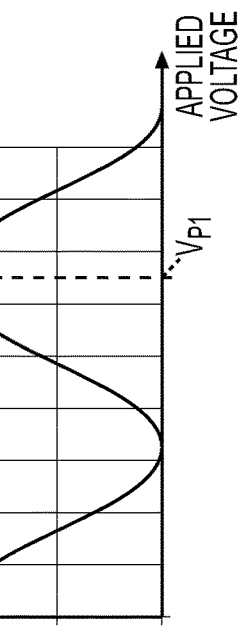

As previously discussed, the optical transmission function of a MZ interferometric waveguide modulator is a sinusoidal (cosine squared) function of an applied voltage. For a y-cut, x-propagating MZ waveguide modulator structure, the modulation efficiency of the TE-polarized light is much higher than that of the TM-polarized light owing to the strongest $r_{33}$ electro-optic interaction, as compared to the TM-polarized light interacting via a much weaker $r_{13}$ coefficient, as shown in FIG. 9D.

In general, with DC1, DC2 set at some arbitrary values, the "preferred" operating points (such as "Peak", "Null" or "Quadrature" points) for each polarization states do not occur at the same time.

Since two independent bias voltages can be applied to DC1 and DC2, it is possible to set the operating points of the TE- and TM-polarized light to any arbitrary points. For example, as shown in the FIG. 9E, the operating point of the TE light can be set at "Null" transmission, while the TM light is set at the "peak transmission at the same time by adjusting the DC1 and DC2 bias voltages. This feature is important in some interesting applications.

A very useful application of a MZ intensity modulator is the generation of optical signals at different optical frequencies by applying an RF signal to the modulator.

When an RF signal at frequency (f) is applied to a MZ modulator, optical signals at various optical frequencies at ($\Omega \pm n \cdot f$) are generated. ($\Omega$ is the optical frequency of the input laser to the modulator, n=integer=0, 1, 2, 3, . . . ). This is known as "Optical Frequency Sideband Generation" technique. There are ample references of this technique discussed in the literature. (See for example: "Integrated optical SSB modulator/frequency shifter," M. Izutsu, S. Shikama, and T. Sueta, IEEE J. Quantum Electron., vol. QE-17, pp. 2225-2227, November 1981.)

For a Mach-Zehnder (MZ) Interferometric modulator, the phase and amplitude characteristics of each optical signals (at $\Omega \pm n \cdot f$) will depend on the operating point of the modulator (i.e. set at "Peak", "Null", or "Quadrature" transmission point, etc.), the differential modulation strength between the two phase modulated waveguide arms of the interferometer, as well as the phase and amplitude of the RF signal inputs to the phase modulator arms.

For the zero-chirp y-cut x-propagating MZ modulator, the electrode structures are symmetrically located with respect to the MZ waveguide circuit so that the electro-optically induced phase changes in the two phase modulator waveguide pair of the MZ have the same magnitude, but opposite in sign. In this particular case, when an RF signal is applied to this MZ modulator, the optical spectrum of the RF-modulated light has a special characteristic when the MZ is set at "Peak" and "Null" transmission points.

When an RF signal centered at frequency (f) is applied to this modulator, the optical frequency spectrum of the modulated optical signals of the TE-polarized light, biased at "Null" transmission and the TM-polarized light, biased at "peak" transmission are shown in FIGS. 10A-E.

At "Null" operating point, the optical output spectrum of the TE-light consists of signals centered only at the odd-order sideband ($\Omega \pm n \cdot f$) locations where n=odd integers. The carrier at frequency ($\Omega$) and all-even-order sidebands are suppressed at this "Null"-transmission point. This is known as the DSB-SC (Double Sideband Suppressed Carrier) signal generation.

At the same time, at "Peak" operating point, the optical output spectrum of the TM-light consists of signals centered only at the original optical frequency ($\Omega$) and at even-order sidebands ($\Omega \pm 2n \cdot f$), where n is an integer including 0. At this "Peak transmission" operating point, modulation is not efficient and most of the light remains at the carrier frequency ($\Omega$), with no modulated signals at odd-order sideband locations. The signals generated at even-order sideband locations are fairly small.

For most interesting applications, only the carrier and signals at the first order ($\pm 1^{st}$) sideband locations are important. FIGS. 10B-E shows only the optical spectrum covering the carrier ($\Omega$) and only the $\pm 1^{st}$ order sidebands at ($\Omega \pm f$).

When the modulator is capable of transmitting and modulating both optical polarization states, and the operating point of each of the polarization states can be set independently, new novel application can be implemented.

The Dual-polarization modulator in which the operating points for the two orthogonal polarization states can be set independently can be used in a variety of advanced applications.

In this invention, an advanced approach in generating and controlling signals for RF Phased-array beam forming systems is introduced. This device complements the basic optically-controlled beam forming system based on earlier inventions described in the following U.S. patents on Phased Array Beam controller using Integrated Electro-optic Circuits:

1) U.S. Pat. No. 5,543,805 dated Aug. 6, 1996,
  Inventor: Suwat Thaniyavarn, Assignee: The Boeing Company
2) U.S. Pat. No. 5,751,248 dated May 12, 1998,
  Inventor: Suwat Thaniyavarn, Assignee: The Boeing Company Details of the operational principle of this optically-controlled RF Phased-array beam forming concept are described in the patents.

Figure 11:
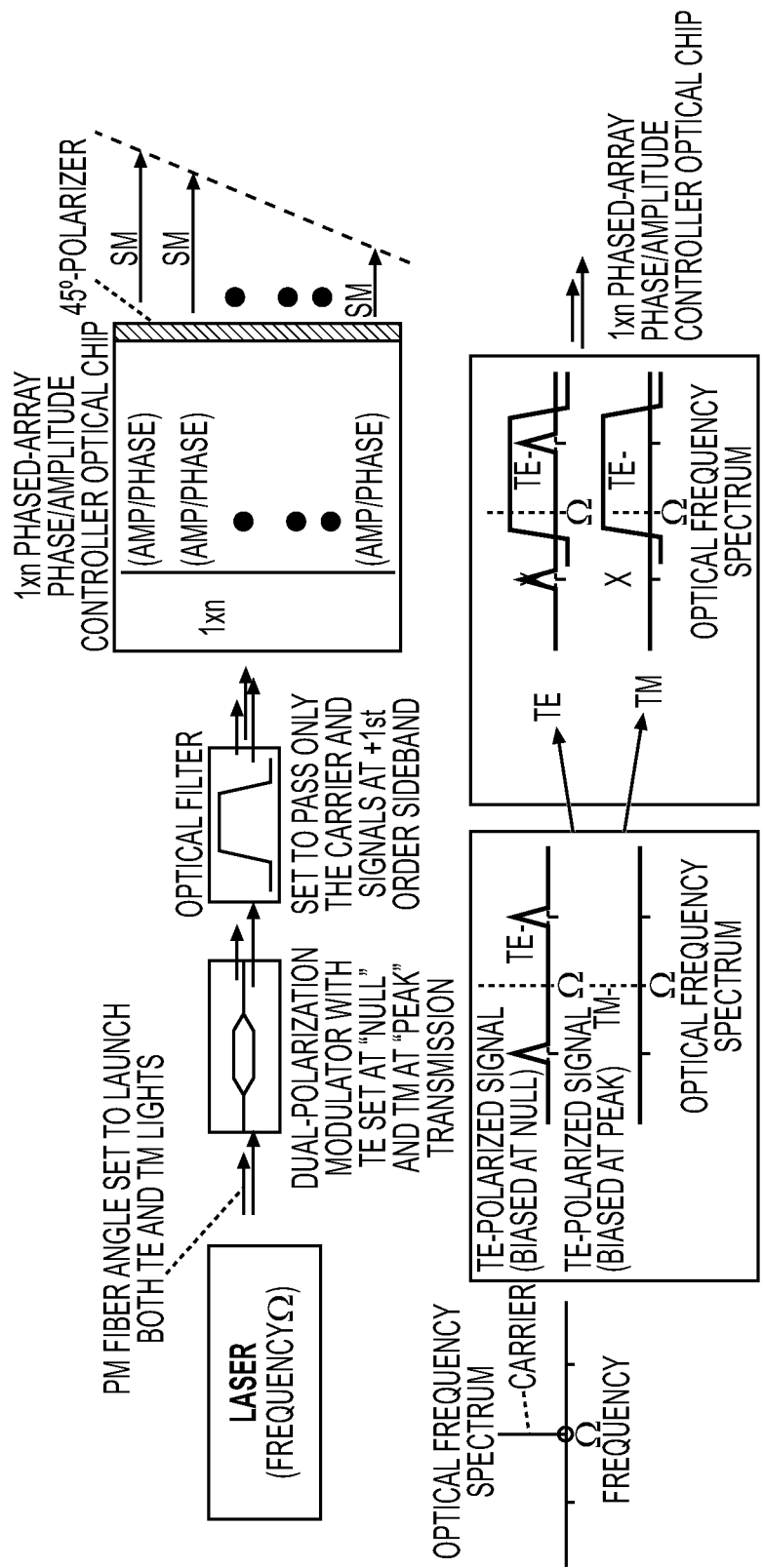
FIG. 11 shows an optically-controlled RF phased-array beam forming system using a dual-polarization modulator.

FIG. 11 shows the use of this device in an optically controlled RF Phased-array beam forming system.

The basic approach is as follows. Light at frequency $\Omega$ is launched into our y-cut x-propagating Dual-polarization MZ modulator with a polarization maintaining (PM) fiber set at an angle with respect to the output polarized light from the laser. For the simplest case, PM fiber input to the modultor is set at 45° so that equal TE and TM light are launched into the modulator. The ratio of the TE and TM light can be adjusted by changing the angle. The modulator is set so that the TE light's operating point is at "Null" transmission, and the TM light is set at "Peak" transmission. An RF signal centered around frequency –f is applied to the RF electrode of the modulator.

With this configuration, with the operating point for TE light set at "Null-point", the RF-modulated optical output TE signals are centered at $\Omega \pm f$ optical sidebands, with the carrier signal suppressed. At the same time, with the operating point for TM light set at "Peak-point", the RF-modulated optical output TM signals are centered at carrier frequency ($\Omega$) and at even $\pm 2$ nf optical sidebands with no signals at odd sideband locations.

As shown in FIG. 11, the outputs of the TE and TM signals are sent to a polarization independent optical bandpass filter, with the transmission band only passing the carrier frequency and the signal at the positive $+1^{st}$ order sideband location centered at ($\Omega+f$) optical sideband location, while the signals at the negative $-1^{st}$ order and at all other sideband locations are suppressed. Polarization independent optical filters using Arrayed Waveguide Grating (AWG) technology are widely-available commercially at low cost for current broadband multi-wavelength fiber-optic telecommunication networks.

After the filter, the TE-light component has only the $1^{st}$ order RF-modulated signal (@$\Omega$+f), with no carrier; the TM-light component has only the carrier component as shown in the FIG. 11.

This TE-light carrying only the RF-modulated signal, and the TM light carrying only the carrier signal are sent to the 1×N electro-optic phase controller chip with a 45° polarizer at the output for an optically-controlled RF phased-array beam forming system.

The operation of this optically controlled RF phased-array beam forming are described in U.S. Pat. Nos. 5,543,805 and 5,751,248. In brief, the TE signal centered (at $\Omega$+f) frequency and the TM signal (at frequency $\Omega\_$) are split by the 1×N optical splitter into N electro-optic differential phase shifters. Each electro-optic phase shifter introduces a differential optical phase shift between the two TE and TM-polarized signals. The TE and TM signals from each channel are sent through a 45° polarizer to a photodetector, resulting in mixing the two signals to form an RF signal centered at frequency f at the output of the photodetector. The optical phase shift introduced by the electro-optic phase shifter translates directly to the RF phase of the output RF signal. The optically-controlled RF phased-array beam forming can be achieved by using the 1×N optical phase-shifters to control RF phases of the RF signals independent of the frequency of the RF signal itself.

Figure 12A:
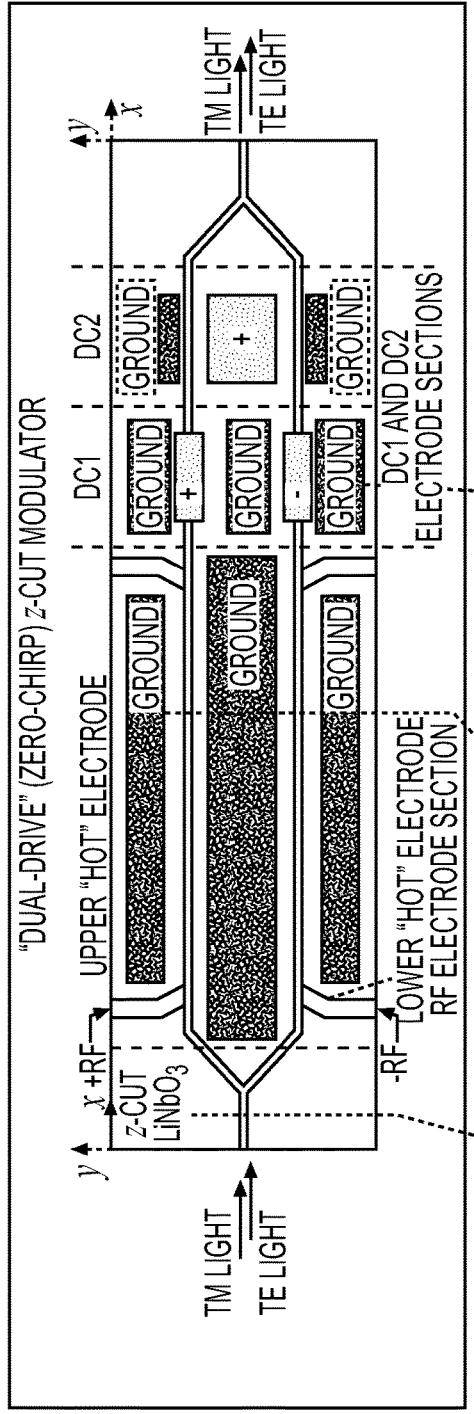
FIGS. 12A-12C show a z-cut, x-propagating MZ waveguide modulator with four electrode structures (Dual-drive RF, DC1 and DC2).
Figure 12B:
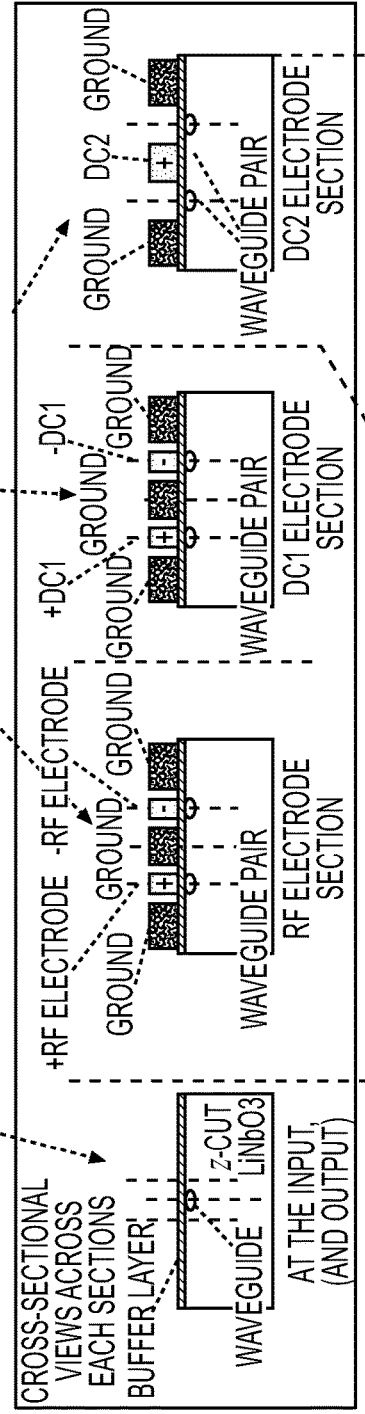
Figure 12C:
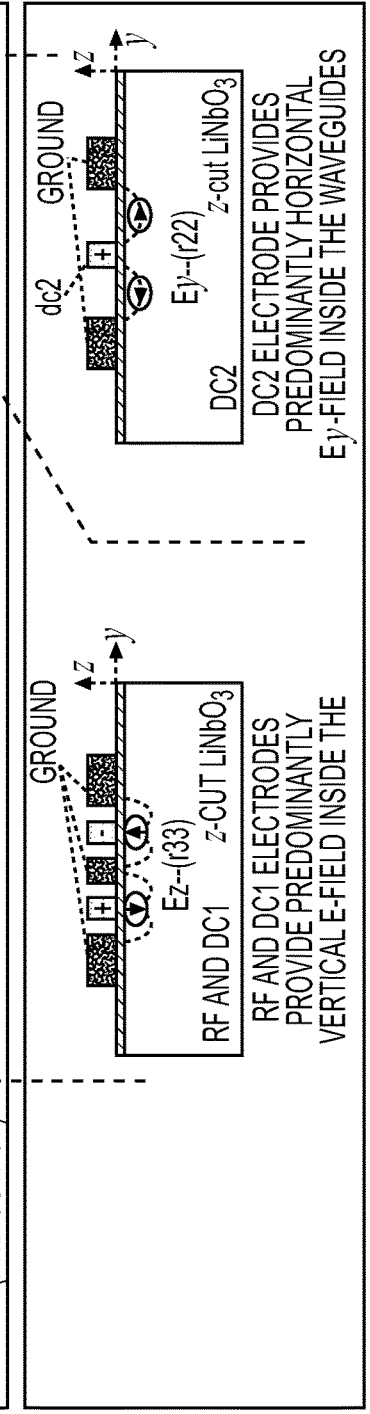

Another $LiNbO_3$ MZ modulator design that can be used to realize a dual-polarization modulator with the operating points of each polarization states can be set independently. This modulator version is shown in FIGS. 12A-C. This modulator is based on a "Dual-drive" z-cut x-propagating MZ modulator with four electrodes, Dual-drive RF electrodes and DC1 and DC2 DC bias electrode structures.

Analogous to the y-cut x-propagation MZ modulator described in appendix C, the z-cut x-progating MZ modulator with Dual-drive RF electrode structure and the two DC1 and DC2 electrode structures. The electrodes are are symmetrically located with respect to the pair of the phase-modulator waveguide in the middle of the MZ waveguide circuit so that the electro-optic induced phase changes are equal but opposite in sign for the light in the two waveguides to produce a chirp-free modulator.

The Dual-drive RF electrode and the DC1 electrode of this z-cut MZ provide predominately the vertical $E_z$ fields inside waveguides, and the DC2 electrode provides predominately the horizontal $E_y$-field inside the waveguides a shown in the FIGS. 12A-C.

Figures 13A, 13B:
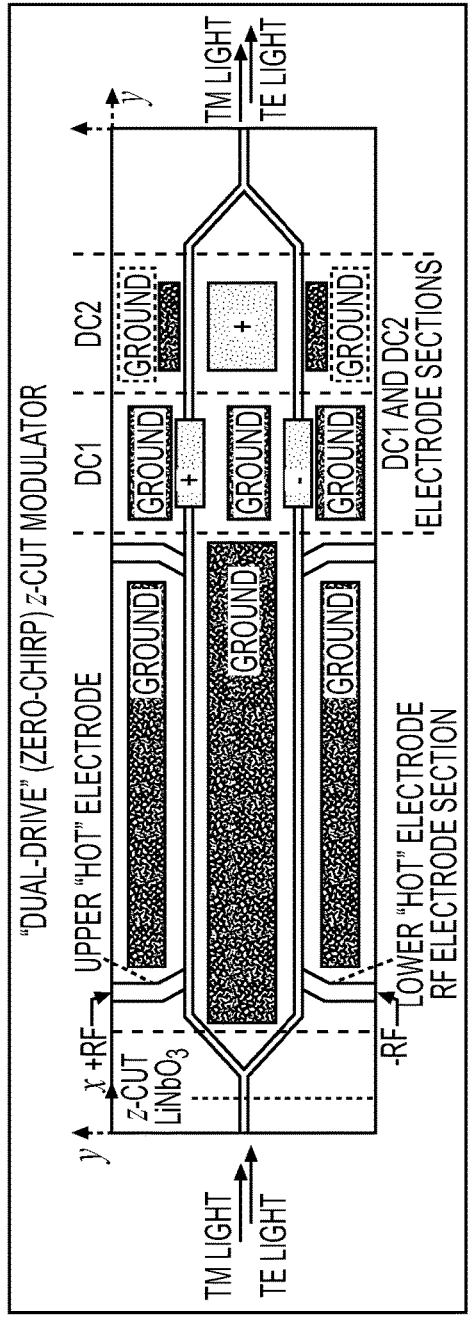
FIGS. 13A-13B show a z-cut, x-propagating MZ waveguide modulator with four electrode structures (Dual-drive RF, DC1 and DC2).

As analogous to the y-cut x-propagation MZ modulator described earlier, the independent DC voltages can be applied to the DC1 and DC2 bias electrode to set arbitrary operating points for each of the the two orthogonal polarized light independently by applying the proper $E_z$ and $E_y$ fields. The electro-optically induced $\Delta n_z$ and $\Delta n_y$ are shown in FIGS. 13A and B.

This dual-drive Z-cut modulator is more complicated than the simpler y-cut modulator discussed with reference to FIGS. 12A-E, since two complementary RF signals need to be applied to the modulator to generate a chirp-free modulation operation, but can be used to realize the same application.

Background of an Optically-Controlled RF Phased-Array Beam Forming System.

This invention discloses introduces an advanced approach in generating and controlling signals for RF Phased-array beam forming systems.

The basic optically-controlled RF phased-array beam forming system is based on an invention described in the following U.S. patents:

U.S. Pat. Nos. 5,543,805 and 5,751,248 describe Phased Array Beam controller using Integrated Electro-optic Circuits.

Details of the operational principle of this optically-controlled RF Phased-array beam forming concept are described in the patents.

In brief, the operation of a basic optically-controlled RF phased-array beam forming system is based on electro-optic phase modulators (tuners), such as those fabricated on an electro-optic LiNbO3 waveguide structure.

A schematic diagram (excerpt from the cited patent above) shows the basic operation of a single-channel electro-optic phase modulator with input light at different optical frequencies in orthogonal polarization states. In this example, the TM-light is at an optical frequency ($f_1$) and the TE-light at an optical frequency ($f_2$), as shown in the diagram below.

By applying a voltage to the electro-optic phase modulator (tuner), unequal electro-optically induced phase shifts ($\phi_1$ for the TM mode and $\phi_2$ for the TE mode) are introduced owing to the different electro-optic interaction between the two polarizations with the applied electric field.

By sending the combination of TM ($f_1, \phi_1$) and TE ($f_2, \phi_2$) optical signals through a 45°-polarizer (with respect to each polarization) to a photodetector, the original TM- and TE-polarized signals will combine (interfere) to form an electrical signal at the photodetector, resulting in generating an RF signal at the frequency $\Delta f=|f_1-f_2|$, with an RF phase of $\Delta\phi=\phi_1-\phi_2$. Basically, the differential optical frequency and the differential optical phase map directly one-to-one onto the frequency and phase of the generated RF signal at the photodetector. Since the differential optical phase can be controlled simply by an applied voltage, an RF signal with easily-tunable phase can be achieved using this very simple electro-optic phase tuner at very high speed. (Detailed discussion can be found in the above cited patents) By extending the concept to a 1×N electro-optic phase tuners, as shown schematically in the figure below (another excerpt from the cited patents), an optical phase-controlled RF phased-array beam forming system can be achieved.

Similarly, a differential electro-optic intensity modulator (tuner) can be added for each channel, which is also mapped directly to the Intensity of the RF signal after the photodetector. (Detailed discussion can be found in the above cited patents)

To complete the basic building block of an optically-controlled RF phased-array system, the frequency-offset optical signals with orthogonal polarizations need to be incorporated. The basic architecture in the form of an integrated photonic circuit (IPC) using a single or multi-chip module packaging concept, is described below for a Transmit Phased-array beam forming system.

Integrated Photonic Circuits (IPC) for Transmit Phased-Array Beam Forming

The next generation of RF systems, such as microwave phased-array antennas can benefit from exploiting wideband photonic signal transmission and signal processing technologies. In order to achieve this goal, application-specific photonic circuits that can perform more complex functions must be realized.

To be practical and cost effective, these optical components should be implemented in the form of an integrated photonic circuit (IPC) based on a compact single chip or multi-chip module, analogous to electrical integrated circuits (IC). Optical components in the form of optical waveguides on planar chips are ideal candidates for integration.

To form a fully-functional photonic circuit, one needs both "active" and "passive" optical waveguide components. Low-loss Electro-optic $LiNbO_3$ integrated optical waveguide circuit technology is an ideal candidate to make a fully-functional high-performance photonic circuit, because of its low-loss and high optical power handling characteristics, and the fact that both electro-optically active components (such as optical modulators, switches and voltage-tunable components, as well as passive components can be realized and integrated on the same integrated photonic circuit (IPC).

While $LiNbO_3$ has many capabilities, there are many lower-cost passive optical components that have not yet been fully developed using $LiNbO_3$ waveguide technology. Excellent examples of these passive components are low-cost mass-produced Arrayed-waveguide grating (AWG) optical bandpass filter/multiplexer components, typically fabricated in silica-based waveguide technology. These components are commercially available owing to their applications in multi-wavelength fiber-optic telecommunication systems.

Since both $LiNbO_3$ and silica-based waveguide components are typically designed and optimized to be compatible with singlemode optical fibers, they are compatible with each other, i.e. the optical mode profiles and sizes can be tailored to achieve low-loss butt-coupling between chips without the aid of an optical fiber interface. A $LiNbO_3$ chip containing an array of electro-optic waveguides and a silica chip containing another matched array of optical waveguides can be chip to chip, butt-coupled to form a rigid, highly-stable multi-chip module that has the capacity to perform complex optical signal processing functions. The basic approach to realizing these functional IPC modules, in particular, for phased-array applications based on chip to chip integration between high-performance custom $LiNbO_3$ chips and commercially available Silica-based passive waveguide circuit chips to form a complete IPC multi-chip module can lead to a practical, low-cost implementation.

Notional Optical Circuit Architecture for an Optically-Controlled RF Transmit Phased-Array Antenna Transmit phased array antenna beam forming requires that an RF signal must be sent to all antenna elements with the proper phase and amplitude for each element. Photonic technology can be used to accomplish this goal. The figure below shows a general schematic diagram of a notional photonic circuit architecture for this application.

The operational principle is as follows:
(1) First, CW light from a narrow-linewidth laser source is split into two paths with a directional coupler waveguide structure (which can be built on a LiNbO3 waveguide chip).
(2) Light in the upper path is modulated by the RF signal using a wideband modulator. The modulated optical sidebands contain the RF signal information. Several types of modulation are possible for this task. In this example, a wideband electro-optic LiNbO3 intensity modulator (based on a Mach-Zehnder interferometric waveguide structure) biased at the 'Null' point can be used to generate a double-sideband with suppressed carrier (DSB-SC) signal. (Alternatively, a phase modulator can be used to generate signals with modulator sidebands and an un-suppressed carrier).
(3) This optical signal is passed through an optical filter, such as an AWG (Arrayed Waveguide Grating) filter, which is designed to only transmit the $1^{st}$ upper sideband signal, while all other sidebands and carriers are suppressed by the filter (as shown)
(4) The polarization of this filtered optical signal is then rotated 90° by a passive ½-wave polarization rotator.
(5) After this stage, both the signals in the upper sideband in the upper path (now with opposite polarization) and the unmodulated light (from the lower path) are combined with a polarization multiplexer
(6) These polarization-combined signals are then sent to a 1×N optical waveguide splitter (that can support both polarization states). Each of the N outputs are sent through a differential electro-optic amplitude and phase tuner (adjusting different amplitude and phase between the two polarization states)
(7) Each of the output channels are sent through a 45°-polarizer, in effect, mixing the two polarization states together. The output of each polarizer is sent to a photodetector at each antenna element. The combined polarizations will mix (interfere) at the photodetector to generate an RF signal. All the differential optical frequency, amplitude and phase are mapped one-to-one directly to the output RF signal. Therefore, by properly adjusting the difference in the relative optical phase (and amplitude) distribution among the optical channels, one can control the relative phases of the RF signals in the phased-array to form the desired phased-array beam.

Issues with this Basic Architecture:

Although it is possible to discretely build all of the optical elements in this basic architecture in the form of IPC chips and then integrate them together to form a multi-chip module for an optically-controlled Transmit Phased-array beam control system, it is desirable to simplify this photonic circuit architecture to minimize the number of IPC chips that need to be integrated to reduce the overall propagation loss and complexity (resulting in increased performance) while maintaining full functionality at reduced cost.

Figures 3, 4:
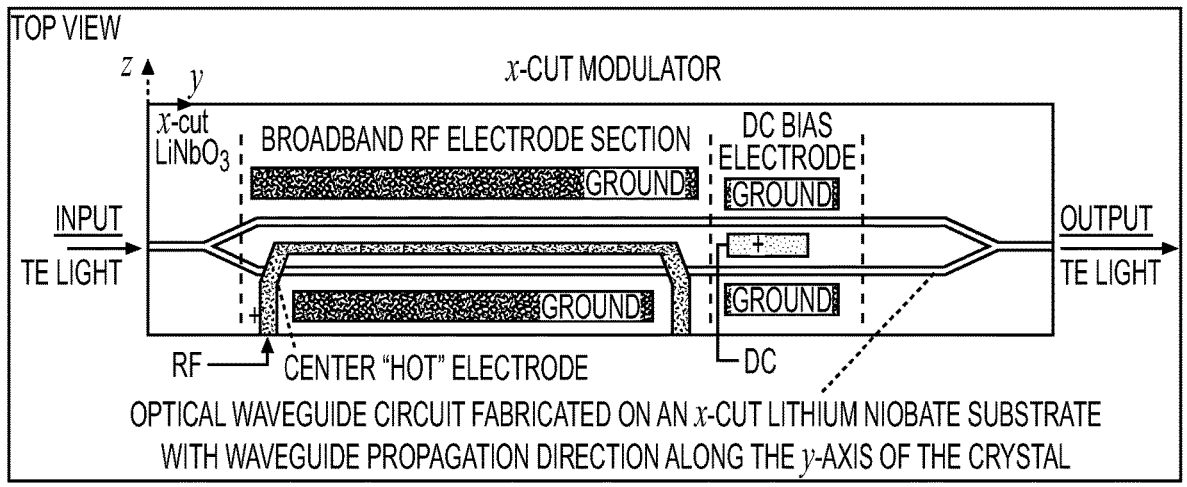
FIG. 3 shows a conventional x-cut, y-propagating MZ waveguide modulator.
FIG. 4 shows electro-optic induced $\Delta n$ for the TE and TM light for an x-cut, y-propagating MZ waveguide modulator.
Figure 5A:
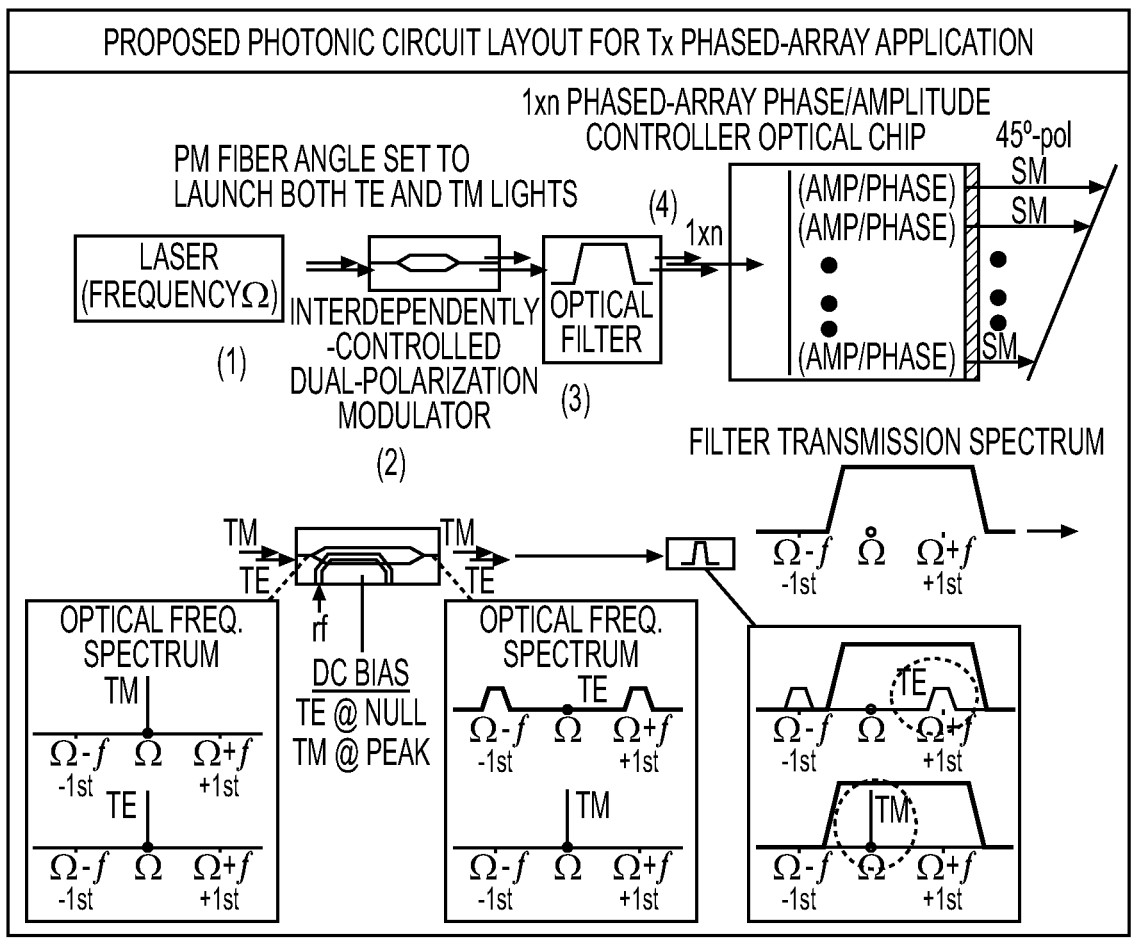
FIGS. 5A and 5B show photonic circuit layout for an optically-controlled RF phased-array beam forming application.
Figure 5B:
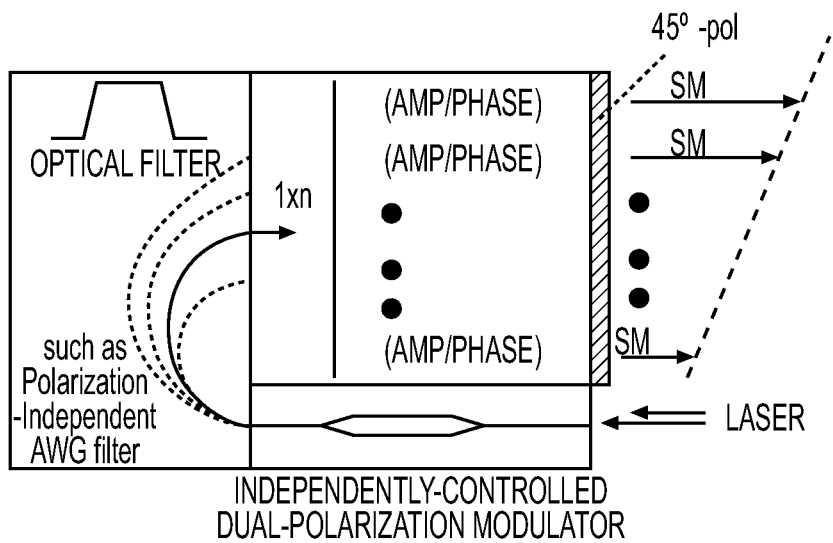

Proposed Approach:

To eliminate the drawbacks of the notional optically controlled transmit phased-array beam forming system described above, a more practical alternate architecture is proposed as shown schematically in FIGS. 5A and 5B. This architecture is much simpler to implement with fewer components, leading to much lower optical insertion loss, and a more compact structure with lower packaging complexity and thus lower cost. This architecture should lead to a more practical implementation of an optically-controlled RF phased-array beam forming system.

Our proposed approach requires only the specially-designed dual-polarization LiNbO3 modulator described in the previous section, a 1×N amplitude and phase controller chip and an optical filter chip. All other optical components including the input 1×2 splitter; the polarization rotator and the polarization multiplexer chips are eliminated, greatly simplifying the implementation.

This architecture requires a unique dual polarization wideband electro-optic modulator with independent phase control for the two polarizations. This unique modulator was described earlier. The modulator can modulate optical signals in both orthogonal polarizations. The operating points of the modulator for each of the optical signals in the two orthogonal polarization states (i.e. TE and TM polarization states) can be set to any position independently of one another.

The operational principle is as follows:
(1) Light from a single-frequency laser source with PM fiber pigtail is launched into a specially-designed dual-polarization LiNbO3 modulator at ~45° with respect to the LiNbO3 crystal axis, by simply attaching the PM fiber at ~45° to the modulator, to launch light in both polarization states into the modulator (designated by the blue and red arrows in the diagram). The ratio of optical power in each polarization states is controlled by simply changing the attachment angle (instead of 45°) of the PM fiber at the modulator chip.
(2) The wideband $LiNbO_3$ MZ waveguide modulator used in this application is designed to operate with low-loss for both polarization states. Titanium diffused optical waveguides are one example of optical waveguides that can operate with very low propagation loss for both polarization states. The electro-optic interaction strength in this $LiNbO_3$ modulator will not be the same for the two polarization states (TE and TM). In this case, the TE light electro-optic interaction is via the strongest $r_{33}$ linear electro-optic coefficient, while the TM light electro-optic interaction is via the weaker $r_{13}$ and $r_{22}$ electro-optic interactions. The $r_{33}$ electro-optic (EO) coefficient is >3 times stronger than the $r_{13}$ and >9 times stronger than the $r_{22}$ EO coefficients, and therefore all efficient LiNbO$_3$ modulators are designed to use the $r_{33}$ interaction. This modulator is designed so that the TE light is modulated by the input RF signal via the strongest EO interaction, $r_{33}$, while the TM light is modulated by the much weaker $r_{13}$ interaction.

To operate properly, the modulator utilizes DC bias electrodes to set the operating point of the TE light at minimum transmission (TE@ null point), while the operating point of the TM light is set to maximum transmission (TE@ peak point). A more detailed description of the operation of this dual-polarization modulator is included in the previous section.

Because the TE light is set at null, the RF modulated TE signal (via $r_{33}$) will be in the form of double-sideband suppressed carrier (DSB-SC) format with the optical spectrum shown in the diagram. At the same time, the TM light is set at peak transmission, the RF modulated TM signal (via weaker $r_{13}$). Under this condition, all the odd orders of RF-modulated sidebands are suppressed (as shown in the diagram).

(3) The modulated light in both polarization states then passes through an optical bandpass filter which only transmits the carrier and the upper $1^{st}$ order sideband as shown. The output of the bandpass filter then consists of TE-light with a single sideband offset from the optical carrier by the RF modulation frequency, and TM-light at the optical carrier frequency.

The result described in (3) above is identical to the notional phased array beamforming architecture described earlier, but the 1×2 splitter, polarization rotator and polarization multiplexer chips have been eliminated. It is clear that a very significant reduction in the overall insertion loss, chip counts, and complexity can be achieved with this architecture making it more viable for actual system implementation.

(4) The light in the two polarization states are then sent to the 1×N amplitude and phase tuner as in the previous case, in which a differential optical phase (and amplitude) can be adjusted on each of the N paths. The two polarization states are then mixed (after passing through a thin 45° polarizer) at the photodetector. All the optical amplitude and phase information is mapped one-to-one to the amplitude and phase of the output RF signal.

The operating principle described above is our baseline approach to realize a practical IPC multi-chip module for transmit RF phased-array beam forming applications. As an additional note, since silica-waveguide based AWG filters can be easily fabricated with folded optical paths so that the input and output waveguides are on the same facet of the chip, the IPC module should be able to be further simplified. The dual-polarization wideband LiNbO3 y-cut, x-propagating LiNbO3 modulator chip described for the first time herein and the 1×N amplitude and phase controller chip can be attached to the AWG filter chip as shown below.

Since both the unique high speed dual polarization modulator and the 1×N amplitude and phase controller can be made in Y-cut, X-propagating LiNbO3, enabling them to be fabricated on the same substrate, resulting in a single step chip-to-chip packaging with the AWG chip to form a very compact, low-cost IPC module for transmit phased-array beam control as shown schematically below. This structure should make photonic technology viable and very attractive for system implementation.

While the invention has been described with reference to specific embodiments, modifications and variations of the invention may be constructed without departing from the scope of the invention, which is defined in the following claims.

I claim:

1. Apparatus comprising:
a dual-polarization optical modulator in which operating points of each polarized light can be set independently and the modulator supports singlemode operation for orthogonal optical polarization states,
the modulator further comprising a Mach-Zehnder interferometric waveguide modulator having an input waveguide, the input waveguide splitting into an interferometric waveguide pair into distinct polarization states of electro-optic phase modulator waveguides in a middle section and the waveguide pair recombines into a singlemode waveguide at the output, and
the modulator having symmetric electrode structures with respect to the interferometric waveguide pair whereby electro-optically induced index changes are equal but opposite in sign of pairs, the polarization states between light inside the two waveguides and the dual polarization optical modulator having independent phase tuning, wherein at least one operating point of each polarization state can be set at an arbitrary point independent of the other polarization state, wherein the independent phase tuning further comprises distinct first and second electrode sections after an RF section.

2. The apparatus of claim 1, wherein the Mach-Zehnder interferometric waveguide modulator has a y-cut x-propagation LiNbO$_3$ waveguide structure with three electrode structures, including one broadband RF electrode and two DC bias electrodes, wherein all electrode structures are symmetrically located with respect to the Mach-Zehnder waveguide circuit and are configured to achieve zero-chirp operation, and one of the two DC bias electrodes is designed and located with respect to the Mach-Zehnder interferometric waveguide pair so as to generate electric field predominating in the horizontal axis inside the waveguide pair, the other of the two DC bias electrodes is designed and located with respect to the Mach-Zehnder interferometric waveguide pair so as to generate electrical field predominating in the vertical axis inside the waveguide pair.

3. The apparatus of claim 2, wherein the operating points of each polarization states can be set independently by applying proper voltages to the two DC bias electrodes.

4. The apparatus of claim 1, wherein the Mach-Zehnder interferometric waveguide modulator has a z-cut x-propagation LiNbO$_3$ waveguide structure with dual-drive RF electrode structures and two DC bias electrodes, and one of the two DC bias electrodes is designed and located with respect to the Mach-Zehnder interferometric waveguide pair so as to generate electric field predominating in the horizontal axis inside the waveguide pair, the other of the two DC bias electrodes is located with respect to the Mach-Zehnder interferometric waveguide pair so as to generate electrical field predominating in the vertical axis inside the waveguide pair.

5. The apparatus of claim 4, wherein the operating points of each polarization states are independently settable by applying proper voltages to the two DC bias electrodes.

6. The apparatus of claim 1, wherein all electrode structures are symmetrically located with respect to the waveguide circuit and are configured for achieving zero-chirp operation.

7. The apparatus of claim 1 wherein the first electrode section is adapted to maximize a first polarity, and the second electrode section is adapted to minimize a second polarity.

8. Apparatus comprising:
an RF phased-array beam forming device having a dual-polarization modulator, the modulator further comprising a Mach-Zehnder interferometric waveguide modulator having an input waveguide, the input waveguide splitting into an interferometric waveguide pair into distinct polarization states of electro-optic phase modulator waveguides in a middle section and the waveguide pair recombines into a singlemode waveguide at the output, and having a RF electrode and two DC electrodes, and configured so that:
the operating point for one polarization state is set at null-transmission point, while the operating point for the other orthogonal polarization state is set at peak-transmission point, and a single-frequency light source configured so that polarized light is launched into the dual-polarization modulator so that both polarization states are present in light at an output of the modulator, the dual polarization optical modulator having symmetric electrode structures with respect to the interferometric waveguide pair whereby electro-optically induced index changes are equal but opposite in sign between light inside the two waveguides and after the interferometric waveguide modulator having independent phase tuning, wherein at least one operating point of each polarization state can be set at an arbitrary point independent of the other polarization state, the dual polarization optical modulator having independent phase tuning, wherein at least one operating point of each polarization state can be set at an arbitrary point independent of the other polarization state, wherein the independent phase tuning further comprises distinct first and second electrode sections after an RF section.

9. The apparatus of claim 8, wherein the modulator is configured for modulating optical signals in both polarizations, and the output is sent to a polarization-independent optical bandpass filter configured so that the optical bandpass filter passes only the carrier and the RF-modulated signals at one of the first order sideband frequency locations, and configured so that the optical bandpass filter suppresses all the modulated signals at other sideband locations.

10. The apparatus of claim 9, wherein the optical bandpass filter is configured to pass a positive $+1^{st}$ order upper sideband and to suppress all the modulated signals at other sideband locations.

11. The apparatus of claim 9, further comprising a 1×N electro-optic phase shifter, wherein the output is configured to supply a combined mixed polarization output to the 1×N electro-optic phase shifter that is configured to introduce a differential optical phase shift between the signal of each polarization.

12. The apparatus of claim 11, further comprising 45°-polarizers, whereby light from each of the N-paths is sent through a 45°-polarizer to mix the signals from both polarizations, and the light is sent to a photodetector configured to convert the mixed optical signal to a RF signal, wherein the differential optical phase of each signal is mapped directly to the phase of the RF signal at the photodetector.

13. The apparatus of claim 12, wherein the device is configured to form an optically-controlled RF phased-array beam forming system.

14. A method comprising providing a dual-polarization optical modulator and independently setting operating points of each polarized light, wherein the modulator supports single mode operation for orthogonal optical polarization states, and the modulator has a Mach-Zehnder interferometric waveguide structure with an input waveguide, splitting into a pair of electro-optic phase modulator waveguides in a middle section where the electrodes reside and then the waveguide pair recombines into a single mode waveguide at the output, and the middle section has symmetric electrode structures with respect to the waveguide pair so that the electro-optically induced index changes are equal but opposite in sign between the light inside two waveguides of the waveguide pair, and the modulator has a y-cut x-propagation LiNbO3 waveguide structure with three electrode structures, one broadband RF electrode and two DC bias electrodes, all electrode structures being symmetrically located with respect to the MZ waveguide circuit to achieve zero-chirp operation, and operating points of polarization states can be set independently by applying voltages to the two DC bias electrodes, the dual polarization optical modulator having independent phase tuning, wherein the independent phase tuning further comprises providing first and second electrode sections after an RF section, and wherein at least one operating point of each polarization state can be set at an arbitrary point independent of the other polarization state.

* * * * *